Feb. 2, 1971 L. A. LOPEZ 3,560,921
AUTOMOTIVE VEHICLE CONDITION INDICATOR UTILIZING HOLOGRAMS
Filed Dec. 19, 1968 3 Sheets-Sheet 2
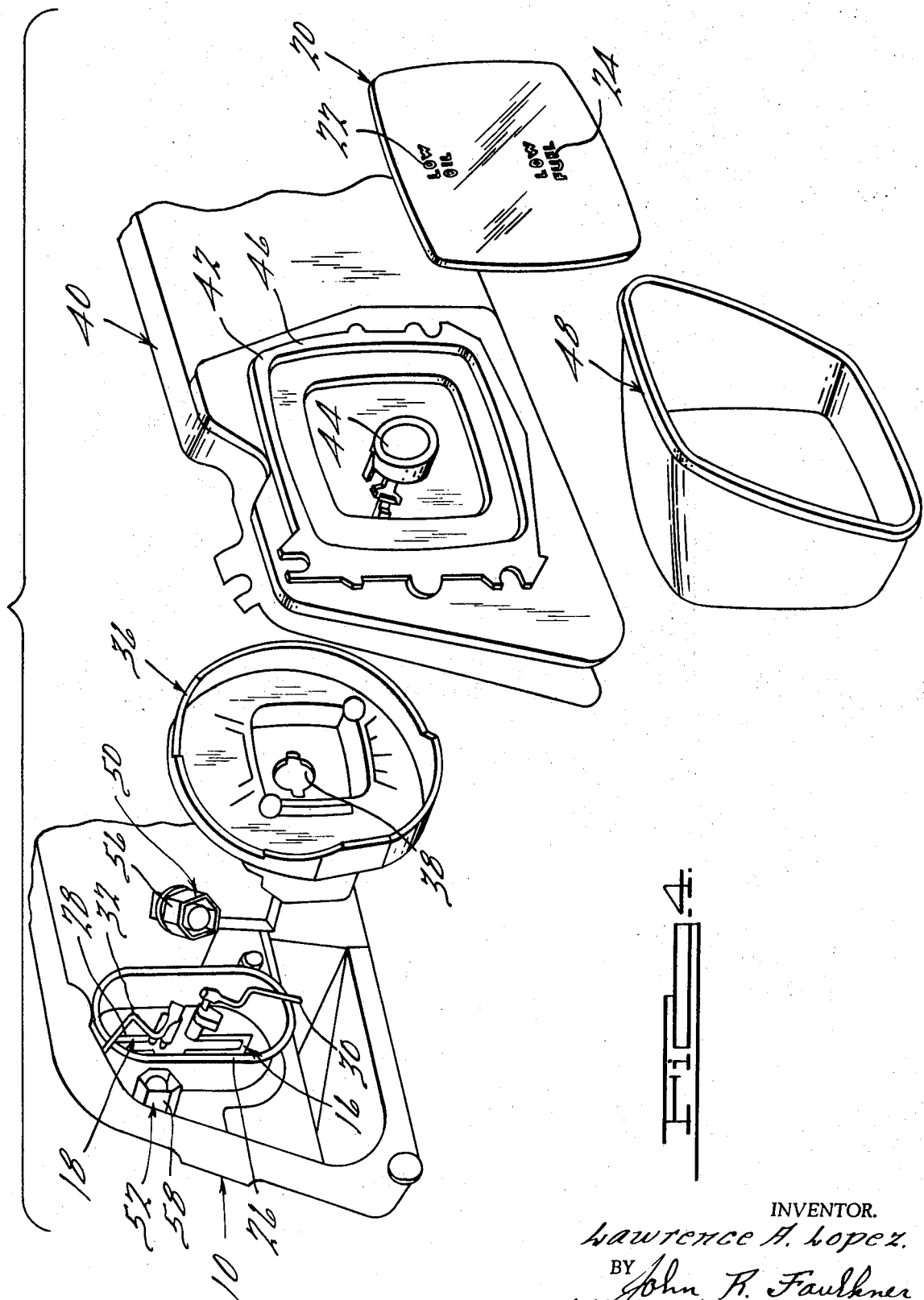
INVENTOR.
Lawrence A. Lopez.
BY John R. Faulkner
Keith L. Zerschling
ATTORNEYS.

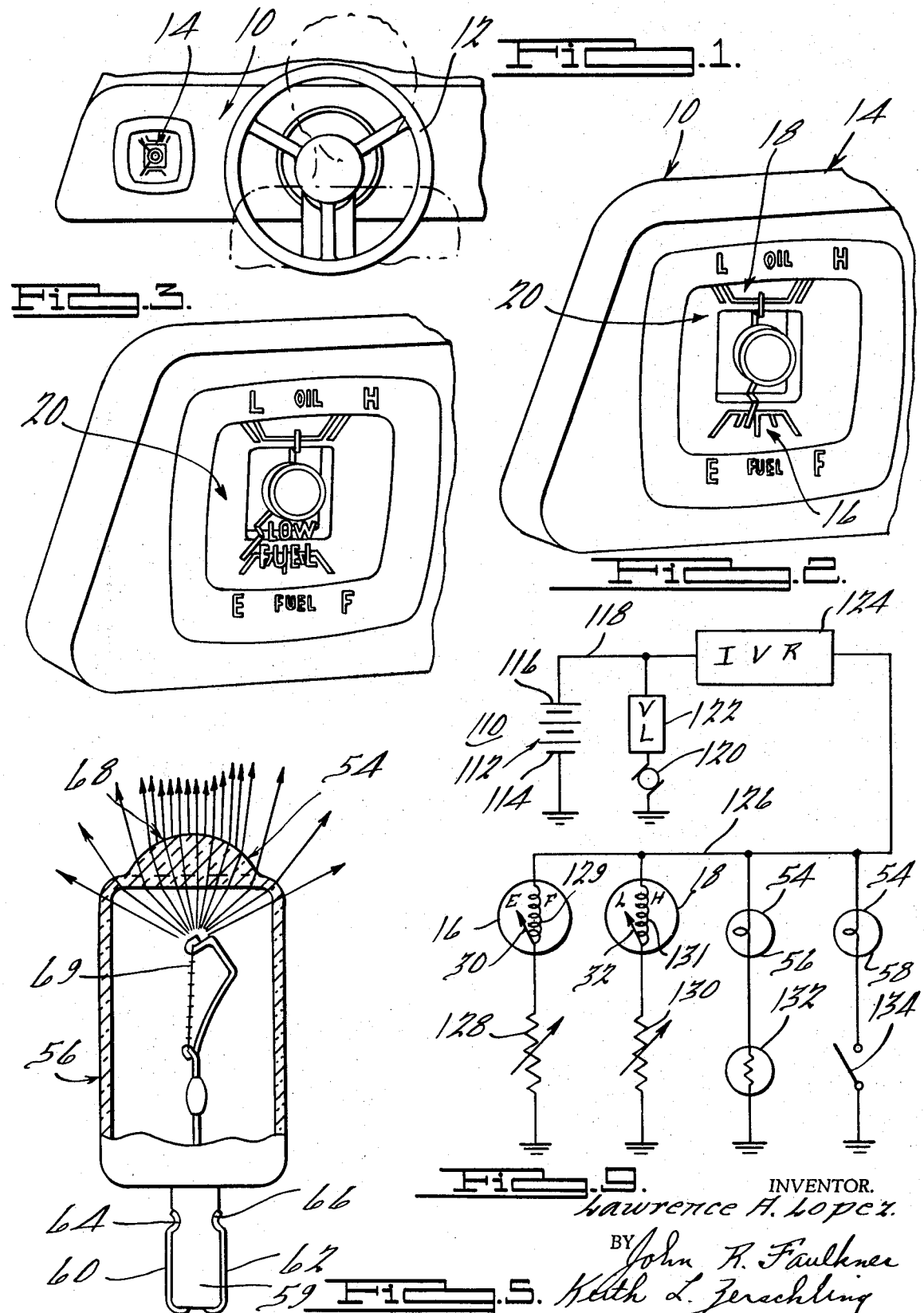

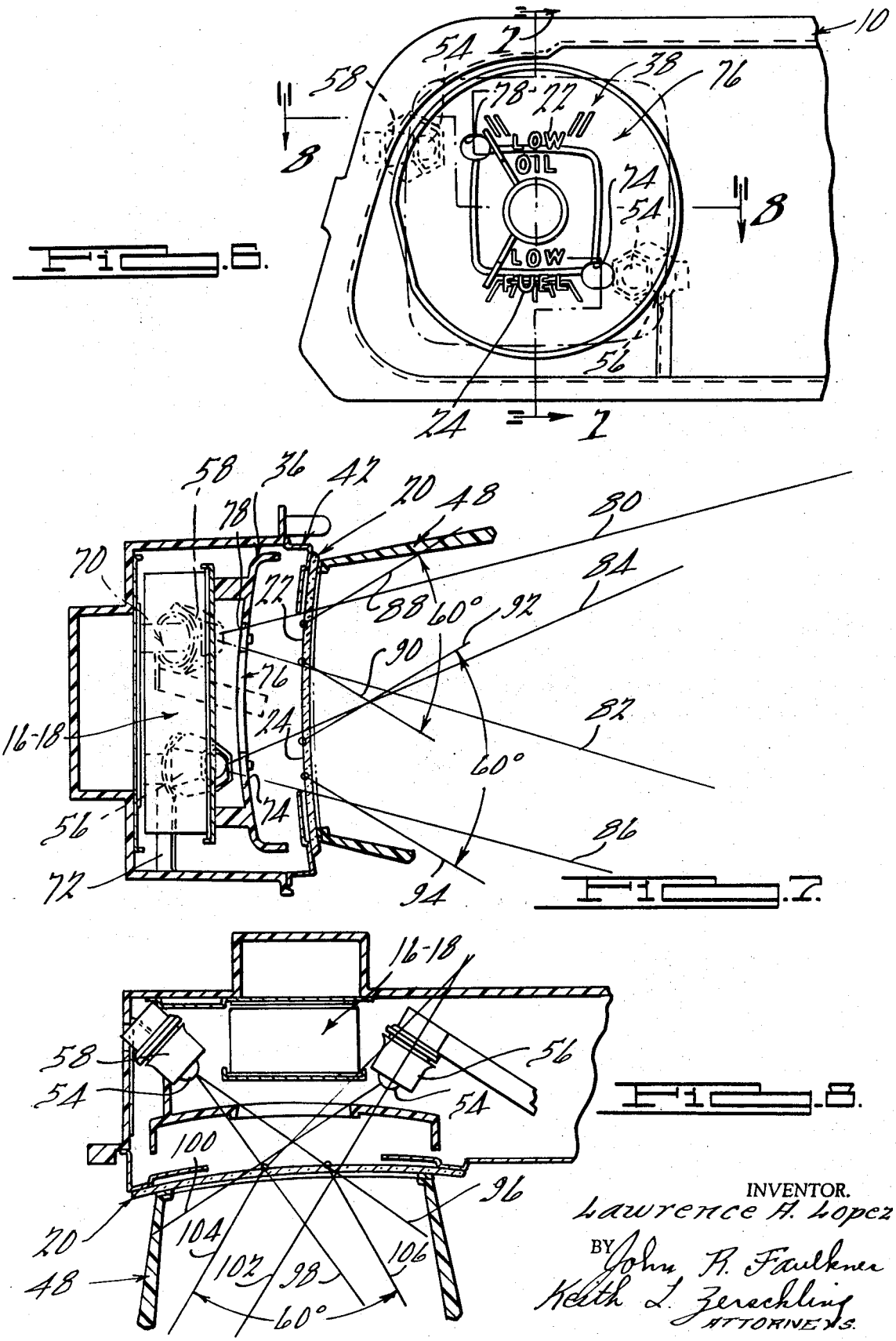

United States Patent Office 3,560,921
Patented Feb. 2, 1971

3,560,921
AUTOMOTIVE VEHICLE CONDITION INDICATOR UTILIZING HOLOGRAMS
Lawrence A. Lopez, Dearborn, Mich., assignor to Ford Motor Company, Dearborn, Mich., a corporation of Delaware
Filed Dec. 19, 1968, Ser. No. 785,111
Int. Cl. B60g 1/00
U.S. Cl. 340—52                                    12 Claims

ABSTRACT OF THE DISCLOSURE

This disclosure relates to an automotive vehicle condition indicator for warning the vehicle operator when one or more conditions relating to vehicle operations are abnormal or are in a certain predetermined state. For example, it may be employed to warn the vehicle operator of a low fuel level condition or a low oil pressure condition. It comprises a transparent plate mounted in the instrument panel in the view of the vehicle operator. A hologram is positioned in this transparent plate and the hologram comprises a series of letters indicating the fact that a vehicle operation is abnormal or is in a certain predetermined state. For example, the hologram may comprise a series of letters "LOW OIL" or "LOW FUEL." Means are mounted in the instrument panel and positioned adjacent the transparent plate and the hologram for illuminating the hologram when the predetermined operating condition occurs. The transparent plate may be the pre-existing transparent plate in an instrument panel positioned over the scale and indicating means of certain gages, for example, the oil gage and fuel gage.

BACKGROUND OF THE INVENTION

This invention relates generally to the field of warning a vehicle operator when one or more vehicle operating conditions is in an abnormal or predetermined state. More particularly, the invention relates to means utilizing holograms for warning the vehicle operator of such a predetermined state, for example, a low fuel level or low oil pressure condition in the vehicle.

It is conventional in automotive vehicles to locate warning lamps in the area of the vehicle operator's forward vision for warning him of certain abnormal conditions in vehicle operations. For example, in current production vehicles warning lamps are provided to indicate a low oil pressure in the lubricating system of the engine of the vehicle and to indicate a low fuel level. These warning lamps, in certain vehicles, supplement the conventional fuel gage and oil pressure gage and are generally located in a position somewhat remote from them. As a result a completely different structure is needed, including a warning lamp and a separately mounted indicia plate, for warning the vehicle operator of these conditions.

The present invention provides a very compact and novel warning means for warning the vehicle operator of certain abnormal conditions in the vehicle operation or when these conditions reach a predetermined state. It comprises a transparent plate with the hologram positioned thereon which is illuminated when the abnormal or predetermined state occurs. This hologram may be positioned in a transparent plate which covers the conventional fuel gage and low oil pressure gage in the vehicles and it may comprise the letters "LOW FUEL" or "LOW OIL" positioned in the transparent plate.

SUMMARY OF THE INVENTION

This invention relates to a condition indicator for an automotive vehicle for warning the vehicle operator when one or more conditions in vehicle operation reach an abnormal or predetermined state. It comprises a transparent plate mounted in the instrument panel of the vehicle in view of the driver. A hologram is positioned in the transparent plate and means are positioned adjacent the plate for illuminating the hologram when the predetermined or abnormal state occurs. The hologram is comprised of a series of letters, or indicia, which indicate to the driver of the vehicle which operating condition has reached the abnormal or predetermined state. For example, the hologram may be comprised of a indicia or series of letters "LOW FUEL" or "LOW OIL."

It is a further feature of the invention to position the hologram in an existing transparent plate in the instrumen panel positioned over certain gages in the vehicle. For example the fuel gage and/or the oil pressure gage. The indicia "LOW FUEL" is positioned in this transparent plate by holographic techniques over the fuel gage, and the letters "LOW OIL" are positioned in the transparent plate by holographic techniques over the oil pressure gage. The illuminating means for illuminating the holograms may be in the form of lamps which are positioned out of the view of the vehicle operator. This may be conveniently accomplished by positioning the lamps behind the opaque plate, with scales positioned thereon, cooperating with the indicating means for the fuel gage and the oil pressure gage. The opaque plate including the scales has apertures positioned therein in alignment with the lamps and the holograms so that energization of the lamps will direct light onto the holograms to make them visible or discernible to the vehicle operator. The lamps may be of a wedge type that are commonly employed in vehicle instrument panels and may include a lens located at the end of the envelope that will direct the light from the filament of the lamp along the axis of the bulb to the hologram that is to be illuminated by it. This provides sufficient light directed onto the hologram to permit the hologram to become visible or discernible to the vehicle operator when the lamp is energized.

The above structure, therefore, makes use of existing components in an automotive vehicle instrument panel. In order to indicate that a vehicle operating condition has reached an abnormal or predetermined state, it is only necessary to position a hologram in an already existing transparent plate in the vehicle and to add a lamp to illuminate it when the abnormal or predetermined state occurs. Furthermore, the appearance of the warning indicator is very desirable from the vehicle operator's standpoint since there are no separate or visible means present when the abnormal or predetermined state has not been reached.

BRIEF DESCRIPTION OF THE DRAWINGS

FIG. 1 is a front elevational view of instrument panel and steering wheel of an automotive vehicle showing the position of the vehicle operator.

FIG. 2 is an enlarged front elevational view of a portion of the instrument panel showing a fuel gage and an oil pressure gage.

FIG. 3 is a view similar to FIG. 2 but showing the hologram used with the present invention illuminated.

FIG. 4 is an exploded view of the invention showing the fuel gage, the low oil pressure gage, the holograms and the means for illuminating the holograms.

FIG. 5 is a sectional view partially in elevation through a lamp bulb of the wedge type which may be used as an illuminating means for illuminating the holograms of the present invention.

FIG. 6 is a front elevational view of the present invention showing the holograms illuminated and the illuminating means in dotted lines.

FIG. 7 is a modified sectional view of the present invention taken substantially along the lines 7—7 of FIG. 6 and showing the illuminating means in dotted lines.

FIG. 8 is a modified sectional view taken substantially along the lines 8—8 of FIG. 6 and showing the illuminating means of the present invention.

FIG. 9 is a circuit diagram showing the electrical connection of the gages and illuminating means of the present invention.

DESCRIPTION OF THE PREFERRED EMBODIMENT

Referring now to the drawings in which like reference numerals designate like parts throughout the several views thereof, there is shown in FIG. 1 an instrument panel 10 of an automotive vehicle together with a steering wheel 12. The vehicle operator is shown in dotted lines positioned in front of the steering wheel 12 and the instrument panel 10. A gage system 14 is located to the left of the vehicle operator as shown in this view so that the vehicle operator may properly view these gages when he is positioned behind the steering wheel 12.

This gage system 14 may, as shown in FIG. 2, comprise a fuel gage 16 and an oil pressure gage 18. A transparent plate 20 of conventional construction is positioned in front of these two gages and covers them. This transparent plate 20 has a pair of holograms 22 and 24 positioned therein, preferably in the rear surface thereof. As can best be seen by reference to FIG. 4 these holograms comprise the letters or indicia "LOW OIL" and "LOW FUEL." The indicia "LOW FUEL" is positioned in front of the fuel gage 16 and indicia "LOW OIL" is positioned in front of the oil pressure gage 18 as can best be seen by reference to FIG. 4.

The fuel gage 16 and the oil pressure gage 18 are suitably mounted in the instrument panel 10. These gages may be of the conventional bimetallic type and have U-shaped bimetallic operating means 26 and 28, respectively, that are operated by means of a heater winding wrapped around one leg thereof. The fuel gage 16 includes an indicating means or pointer 30 operated by the U-shaped bimetallic means 26 giving an indication by moving in proportion to the amount of current flow through the winding wrapped around one leg of the U-shaped bimetallic means 26. The oil pressure gage also has indicating means or pointer 32 that operates in a similar manner.

An opaque dial plate 36 is positioned over the fuel gage 16 and the oil pressure gage 18, and it has a central aperture 38 positioned therein that receives the indicating means 30 of the fuel gage 16 and the indicating means 32 of the oil pressure gage 18. The instrument panel 10 also includes a front plate 40 that is mounted over the two gages 16 and 18 and the opaque dial plate 36. This structure includes a frame 42 for the two gages which has an apaque hub 44 that is adapted to be positioned over the pivotal portions of the indicating means 30 and 32 to obscure the view of the connection of the indicating means 30 and 32 to the U-shaped operating means 26 and 28 from the vehicle driver. The transparent plate 20 with the holograms 22 and 24 positioned thereon is received on a flange 46 in the frame 42 and is spaced from the hub 44, the dial plate 36 and the indicating means 30 and 32 of the fuel gage and oil pressure gage 16 and 18, respectively. An opaque hood 48 may be positioned over the frame 46 and be affixed thereto. This hood is in the form of a viewing hood and is conventional in automotive vehicle construction.

An illuminating means 50 is provided for the hologram 24 positioned in transparent plate 20, while a similar illuminating means 52 is provided for the hologram 22 positioned in transparent plate 20. The illuminating means 50 and 52 each comprise a wedge type lamp bulb 54, as shown in FIG. 5, that is positioned in sockets 56 and 58, respectively, of the illuminating means 50 and 52.

The lamp bulb 54 is shown specifically in FIG. 5 and it is of the conventional wedge base type construction having a glass envelope 56, with a glass base 59 through which leads 60 and 62 protrude. These leads 60 and 62 are positioned within notches 64 and 66 respectively. The base is adapted to be positioned within a socket, i.e., socket 56 or 58, which has terminals engaging the leads 60 and 62 and the notches 64 and 66.

The lamp bulb 54 has a lens portion 68 positioned on the end thereof that directs the light rays emanating from the filament 69 connected to leads 60 and 62 along the axis of the bulb as shown in FIG. 5. These rays may be substantially parallel to the axis of the bulb, or may converge or diverge slightly from it. In any event, the light rays are directed onto the holograms 22 and 24 positioned in the transparent plate as will be more specifically described in relation to FIGS. 6, 7 and 8.

Referring now to FIGS. 6, 7 and 8, there is shown more specifically the positioning of the means 50 and 52 for illuminating the holograms 22 and 24 with respect to the remainder of the components in the structure. The lamp sockets 56 and 58 are mounted in the instrument panel 10 on supporting brackets 70 and 72 and these sockets, as will be explained more fully subsequently, are connected into the electrical system of the vehicle and to certain sensing means for sensing low fuel levels and low oil pressure levels. The socket 56 is arranged so that the lamp 54 positioned in it will direct light through an aperture 74 positioned in the main body portion 76 of the opaque dial plate 36 and onto the hologram 24, which when illuminated will cause the indicia "LOW FUEL" to be visible to the vehicle operator. Similarly, the lamp bulb 54 positioned in socket 58 will direct light through aperture 78 positioned in the main body portion 76 of the opaque dial plate 36 and onto the hologram 22, which will make the indicia "LOW OIL" visible to the vehicle operator when the hologram 22 is illuminated.

Referring now specifically to FIG. 7, which shows a modified vertical sectional view of the structure shown in FIG. 6, it will be seen that the light rays emanating from the lamp bulb 54 positioned in socket 58 will be confined between the lines 80 and 82 and will therefore be directed on the hologram 22. On the other hand, the light rays emanating from the lamp bulb 54 positioned in lamp socket 56 will be confined between the lines 84 and 86 and will therefore be directed onto hologram 24. Each hologram 22 and 24 has a minimum angle of viewer visual contact in the vertical direction of 60°, as defined by lines 88 and 90 with respect to hologram 22 and as defined by the lines 92 and 94 with respect to hologram 24.

With respect to the horizontal emanation of the light from the light bulbs 54 and the minimum angle of viewer visual contact with two holograms 22 and 24 in the horizontal direction reference is made to FIG. 8. The light rays emanating from the lamp bulb 54 positioned in the lamp socket 58 are confined within the limits defined by lines 96 and 98, while the light emanating from the lamp bulb 54 positioned in lamp socket 56 is confined within the lines denoted by the numerals 100 and 102. The minimum angle of viewer visual contact with both holograms 22 and 24 is 60° in the horizontal as defined by the angle between the lines 104 and 106. Thus the region which the viewer may view the two holograms 22 and 24 when they are illuminated is in actuality a truncated cone truncated along the rear surface of the transparent plate 20 at holograms 22 and 24 which truncated cone has an apex angle of 60°. These regions are easily within the view of the vehicle driver as he is positioned behind the steering wheel 12 as shown in FIG. 1. Of course, these angles may be different depending upon different locations of the warning indicating means using the holograms.

Referring now to FIG. 9 there is shown a circuit arrangement for energizing the lamp bulbs 54 positioned within the lamp sockets 56 and 58. This electrical circuit includes a source of electrical energy 110 of an automotive vehicle comprising electrical storage battery 112 having one terminal, the negative terminal 114, connected to ground and a positive terminal 116 connected to a line 118. A direct current generator 120, either in the form of direct current dynamoelectric machine or an alternator with a rectifier, supplies output power to a voltage limiter 122 connected at one terminal to the generator 120 and having the other terminal connected to the line 118. Thus, raw generated voltage appears on the line 118 and is applied to an instrument voltage regulator 124 which supplies a substantially constant effective voltage to the instrument system of the vehicle irrespective of the voltage appearing on the line 118.

The output voltage from the instrument voltage regulator 124 appears on the output line 126 and is applied to one terminal of the fuel gage 16, to one terminal of the oil pressure gage 18, to one terminal of lamp 54 positioned in socket 56 and to one terminal of lamp bulb 54 positioned in lamp socket 58. The other terminal of the fuel gage 16 is connected to ground through a variable resistor 128 the resistance of which is varied as a function of the level of fuel in the fuel tank of the vehicle. It has its maximum value when the fuel tank is empty and its minimum value when the fuel tank is full thereby properly operating the indicating means or pointer 30 of the fuel gage by current through the heater winding 129 of the U-shaped bimetallic means 26. Similarly, the other terminal of the oil pressure gage 18 is connected to ground through a variable resistor 130 which has its maximum value when the oil pressure is at a minimum and its minimum value when the oil pressure is at a maximum thereby properly operating the indicating means or pointer 32 of the oil gage by current through the heater winding 131 of the U-shaped bimetallic means 28.

The other terminal of bulb 54 positioned in socket 56 is connected to ground through a thermister 132 positioned in the fuel tank of the vehicle. This thermister is ordinarily covered or emersed in the fuel, but when the fuel level reaches a certain critical low level, for example, 3 gallons, the thermister becomes uncovered thereby causing its temperature to rise and its resistance to decrease sufficiently to energize lamp bulb 54 positioned in socket 56. When this happens, the hologram 24 is illuminated thereby making the indicia "LOW FUEL" visible to the vehicle operator.

A switch 134 operated by the pressure of the oil in the lubricating system of the internal combustion engine of the vehicle is connected between the other terminal of the lamp 54 positioned in socket 58 and ground. This switch is normally closed when the oil pump of the internal combustion engine is not operating and will be opened as shown when the pressure of the lubricating oil is normal. When this pressure falls to a critical low level, however, the switch 134 will close thereby energizing lamp 54 positioned in socket 58. This causes the light from the lamp bulb 54 to impinge on hologram 22 thereby making the indicia "LOW OIL" visible to the vehicle operator.

The present invention thus provides a warning indicator for indicating to the vehicle operator when a predetermined operating condition occurs in the vehicle. It comprises a hologram positioned on a transparent plate mounted in the instrument panel of vehicle, with means positioned adjacent to the plate for illuminating the hologram when the predetermined operating condition occurs. The hologram, of course, is invisible when it is not illuminated, and therefore the hologram may be positioned in a transparent covering plate present in the instrument panel of a conventional vehicle. As disclosed here, for example, the holograms may be positioned in a transparent plate positioned over the oil pressure gage and the fuel level gage and may have the indicia "LOW OIL" and "LOW FUEL" positioned therein adjacent these gages. As a result, the present system utilizes parts already present in an automotive vehicle instrument panel and does not change the appearance of the panel except when the abnormal or predetermined operating conditions occur.

The invention disclosed will have many modifications which will be apparent to those skilled in the art in view of the teachings of this specification. It is intended that all modifications which fall within the true spirit and scope of this invention be included within the scope of the appended claims.

What is claimed is:

1. A condition indicator for an automotive vehicle for indicating when a vehicle operating condition is in a predetermined state comprising a transparent plate mounted in the instrument panel of the vehicle, a hologram positioned in the transparent plate, and means positioned adjacent the plate for illuminating the hologram when the operating condition is in the predetermined state.

2. The combination of claim 1 in which the hologram is comprised of a series of letters indicating the predetermined operating state to the vehicle operator.

3. The combination of claim 1 including a gage for indicating the operating condition and said transparent plate is positioned over said gage, said hologram comprising a series of letters indicating to the vehicle driver when the operating condition reaches a predetermined state.

4. The combination of claim 3 in which said gage is a fuel gage and said series of letters of the hologram comprise the letters "LOW FUEL."

5. The combination of claim 3 in which said gage is an oil pressure gage and said series of letters comprise the letters "LOW OIL."

6. The combination of claim 1 in which said hologram is transparent when not illuminated and becomes visible to the vehicle operator when illuminated.

7. The combination of claim 6 in which said means positioned adjacent the plate for illuminating the hologram comprises a lamp bulb and means enclosing said lamp bulb for shielding said lamp bulb from the view of the vehicle operator.

8. The combination of claim 7 in which said lamp bulb includes a transparent envelope having a lens formed therein for directing light on the hologram.

9. In an automotive vehicle, the combination comprising a gage for indicating the value of an operating condition, an instrument panel, means mounting said gage in said instrument panel, a transparent plate, means mounting said transparent plate over said gage, said transparent plate having a hologram positioned in one surface thereof comprising an indicia for warning the vehicle operator when the value of the operating condition is of a predetermined critical value, and means mounted in said instrument panel for illuminating said hologram when the value of the operating condition is at said predetermined critical value.

10. The combination of claim 9 in which said gage is a fuel gage for indicating the level of fuel in the fuel tank of the vehicle and said indicia on the transparent plate warns the vehicle operator of a low fuel level.

11. The combination of claim 10 in which said gage is an oil pressure gage for indicating the oil pressure in the lubricating system of an internal combustion engine mounted in the vehicle and said indicia on the plate when illuminated warns the vehicle operator of a low oil pressure condition.

12. The combination of claim 9 in which said gage includes an opaque plate having a scale positioned thereon and an indicating means extending through an opening in said opaque plate cooperating with said scale, said means for illuminating the hologram being positioned behind said opaque plate so that said opaque plate is positioned between said means for illuminating said hologram and said transparent plate with the hologram positioned therein, said opaque plate having an opening positioned therein in alignment with said means for illuminating said hologram and in alignment with said hologram.

References Cited
UNITED STATES PATENTS
2,711,525 6/1955 Kelley _____ 340—52
3,455,410 7/1969 Wilson _____ 340—52X

OTHER REFERENCES

Stroke, G. W. and Labeyrie, A. E.: "White-Light Reconstruction of Holographic Images Using the Lippmann-Bragg Diffraction Effect," Physics Letters, 20(4), p. 368, Mar. 1, 1966.

Lanza, C.: "Display Device," IBM Technical Disclosure Bulletin, 8(11), pp. 1559–1560, April 1966.

DONALD J. YUSKO, Primary Examiner

G. R. SWANN III, Assistant Examiner

U.S. Cl. X.R.

340—59, 60; 350—3.5